Sept. 22, 1936.   R. D. ROBINSON ET AL   2,054,949
METHOD FOR PREPARING RAISINS FOR PACKING
Filed Sept. 10, 1932   3 Sheets-Sheet 3
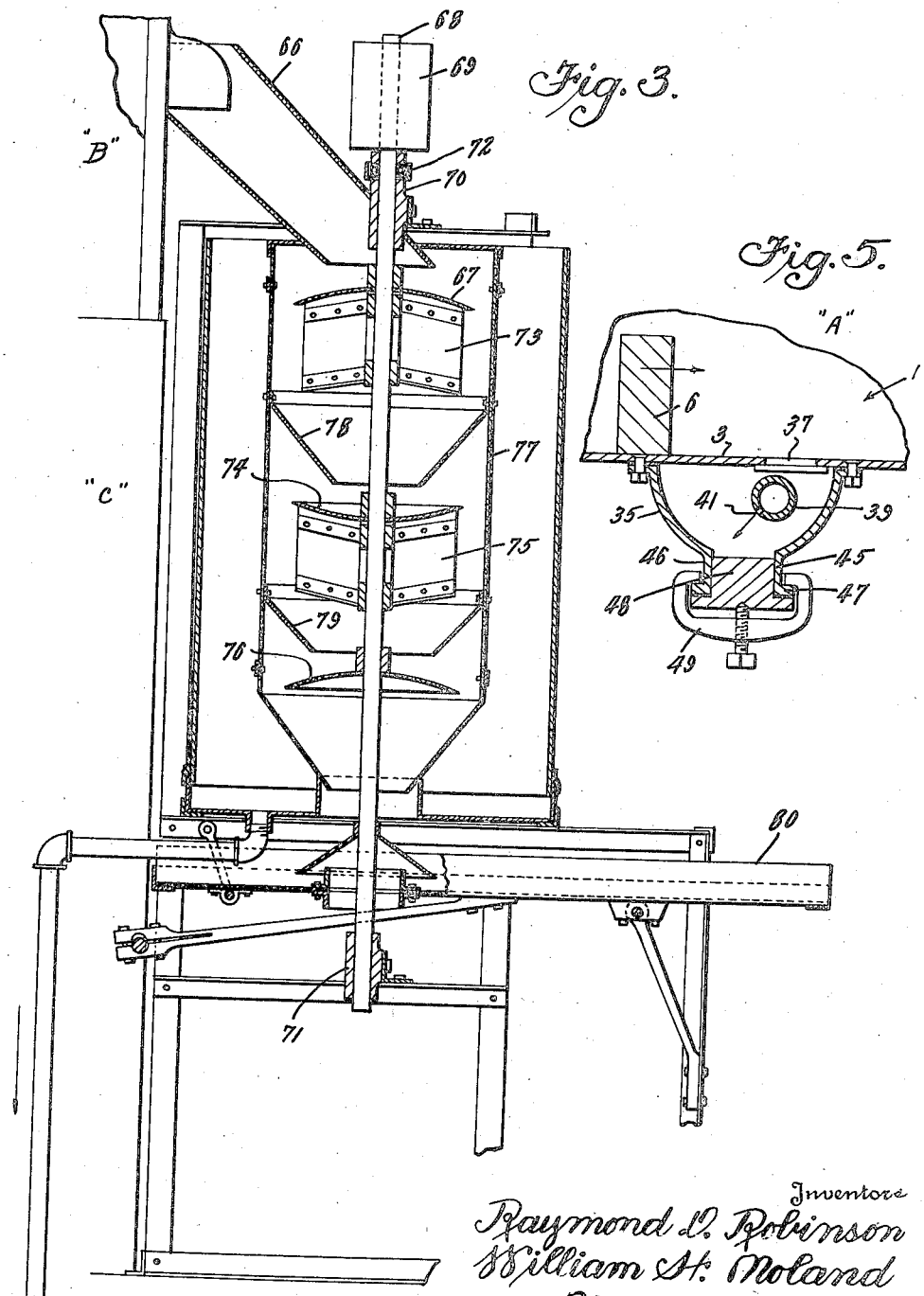

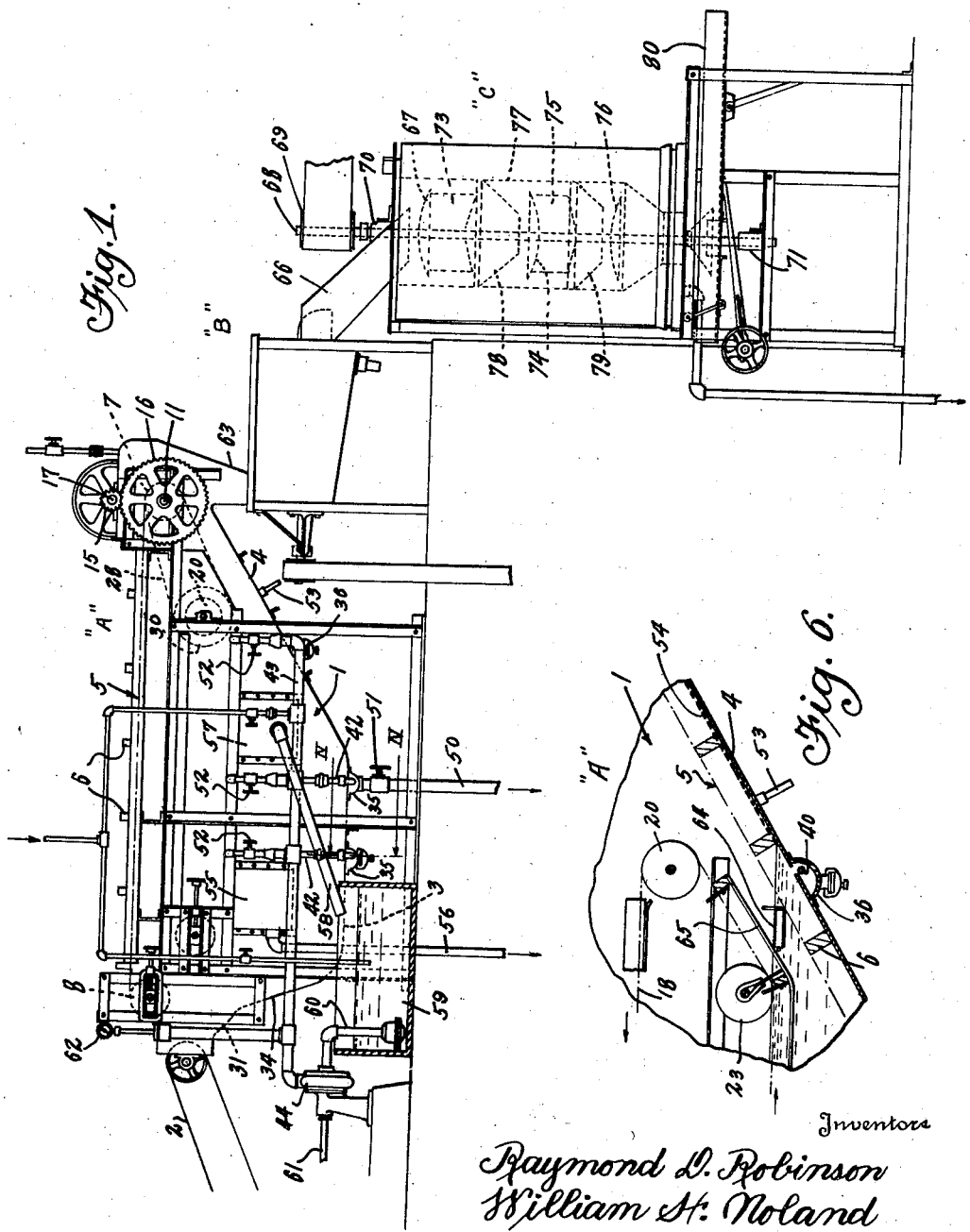

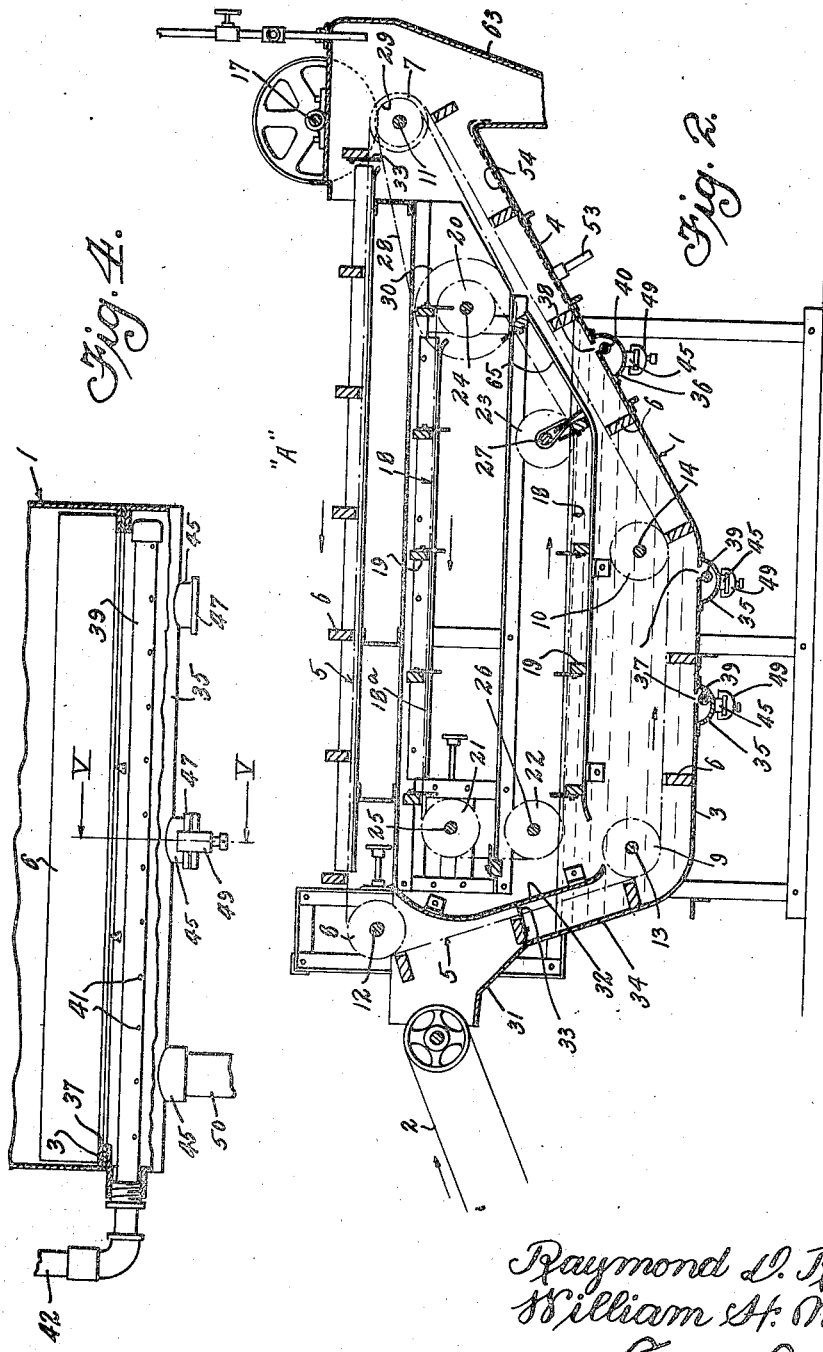

Patented Sept. 22, 1936

2,054,949

UNITED STATES PATENT OFFICE 2,054,949

METHOD FOR PREPARING RAISINS FOR PACKING

Raymond D. Robinson, Oakland, and William H. Noland, Fresno, Calif., assignors to California Packing Corporation, San Francisco, Calif., a corporation of New York Application September 10, 1932, Serial No. 632,508

1 Claim. (Cl. 209—173)

This invention relates to a method and apparatus for the cleaning of fruit such, for example, as raisins, to prepare the same for packing.

In the preparing of fruit such, for example, as raisins for packing, the raisins must first be cleaned and with raisins as delivered to the packing houses, there is found a considerable quantity of foreign matter varying from sand and rocks to nails and other portions of metal.

In preparing raisins for packing, it is also necessary or desirable to remove from the raisins the stems. The raisins, according to their condition of dryness, and likewise in accordance with other conditions, vary as to their sugar content. Good raisins have a high sugar content, while an inferior grade of raisins carry a low sugar content. The result is that good raisins are of greater specific gravity than the inferior grades.

It is an object of this invention to provide a method and apparatus for removing from the raisins foreign matter such as sand, rocks, portions of metal and the like, while the raisins are being washed.

Another object of this invention is to provide a method and apparatus for removing foreign matter from raisins while they are being washed, for removing other matter from the raisins, such as stems, leaves and the like, and for then removing from the raisins the adhering water and drying the raisins to prepare the same for packing.

Another object of this invention is to provide a method of taking fruit, particularly raisins, which include the steps of propelling the fruit through a liquid and at the same time subjecting the fruit or raisins to a current or spray of moving liquid to separate the fruit from foreign matter having a specific gravity greater than the fruit, and then removing the fruit from the liquid and its separated foreign matter.

Another object of this invention is to provide a method in the cleaning of raisins which includes the immersing of the raisins in a liquid, subjecting the raisins to blasts of fluid to separate foreign matter therefrom while in the washing liquid, removing the cap stems and other foreign matter from the raisins, and then drying the raisins.

Other objects and advantages of our invention it is believed will be apparent from the following detailed description of a preferred embodiment thereof as illustrated in the accompanying drawings.

In the drawings:

Figure 1 is a side elevation of the apparatus utilized in carrying out the method embodying our invention.

Figure 2 is a sectional side elevation of the washing apparatus embodying our invention.

Figure 3 is a side elevation of the drying apparatus utilized in carrying out the method embodying our invention.

Figure 4 is a fragmental sectional end elevation taken substantially on the line 4—4 of Figure 1.

Figure 5 is a sectional view taken substantially on the line 5—5 of Figure 4.

Figure 6 is a fragmental view of a modified form of apparatus embodying our invention.

In the preferred embodiment of our invention as illustrated in the accompanying drawings, there are included three principal units, including the washing unit A, a recleaning unit B, and a drying unit C through which the fruit to be prepared for packing is passed in carrying out the method embodying our invention.

The washing unit A preferably includes a tank 1 in which a washing liquid, which may be water, is maintained. The fruit or raisins to be cleaned are delivered into the tank 1 by any suitable or desirable means such, for example, as by a conveyor 2.

Means are provided within the tank 1 for moving the raisins through a washing liquid contained therein, which means are preferably of the following construction, and includes means for moving the heavier raisins along the bottom 3 and inclined exit portion 4 of the tank 1 and a means for moving the lighter raisins along the surface of the liquid in the container 1. The means for moving the fruit along the bottom 3 and inclined portion 4 of the tank 1 is a conveyor 5 carrying advancing members 6 spaced along its length. The conveyor 5 is trained over guide sprockets 7, 8, 9, and 10. The conveyor 5 is preferably formed of two spaced chains between which the advancing members 6 are connected to substantially the width of the container 1. The chains are trained over spaced sprockets 7, 8, 9, and 10 which are supported upon shafts 11, 12, 13, and 14 supported in bearings transversely of the container 1. The shaft 11 is driven by means of a gear 15 which meshes with a pinion 16 secured to the shaft 11.

The gear 15 is mounted on a shaft 17 and the shaft 17 is driven from any suitable or desirable source of power. The conveyor 18, provided for conveying the floating raisins along the surface of the liquid in the container 1, is of similar construction to the conveyor 5 in that it is formed of spaced chains between which advancing members 19 are positioned in spaced relation along the length of the conveyor 18. Chains 18a are passed over spaced sprockets 20, 21, 22, and 23 secured to shafts 24, 25, 26, and 27. The shafts 24, 25, 26, and 27 extend transversely of the tank 1 and are mounted in suitable bearings. The shaft 24 is driven by means of a chain 28 from a sprocket 29 secured to the shaft 11, which chain 28 is trained over a sprocket 30 secured to the shaft 24.

In the receiving throat 31 of the container 1 is mounted a baffle plate 32 which directs the raisins as they are delivered into the container 1 downwardly into the washing liquid. The advancing members 6 carried by the conveyor 5 are provided with resilient strips of material 33 so that they approximately fit between the baffle 32 and the front wall 34 of the container 1 so as to move downwardly under the surface of the liquid in the container 1 the raisins as they are delivered to container 1.

Each of the advancing members 6 may be so provided with strips of resilient material 33 or, as illustrated in the drawings, only one of such advancing members need be provided with such a strip of resilient material.

This means is provided so that the raisins are all at some time forced to below the surface of the liquid in the container 1 so that the heavier raisins will sink within the liquid and the lighter raisins, due to their buoyancy because of a smaller sugar content, will rise to the surface of the liquid. As, however, the raisins take on more water as they are passing through the container 1, more of the raisins will sink to the bottom of the container, and if the raisins were not first submerged in the liquid it would be found that many of the raisins, because of their state of dryness, would float on the surface of the liquid when otherwise they would not so do.

In order to maintain the conveyors 5 and 18 in proper separating condition within the container 1, means are provided for maintaining the chains thereof tight, which means are, as illustrated to include means for shifting the shaft 12 of the conveyor 5 to tighten the chains of this conveyor and for moving the shaft 25 to tighten the chains of the conveyor 18.

Means are provided within the container 1 and below the surface of the cleaning liquid therein for agitating the raisins as they are being propelled through the liquid by means of the conveyors 5 and 18, which means is preferably of the following construction:

Mounted in the bottom 3 and in the inclined portion 4 of the container 1 are troughs 35, 35, and 36, respectively. The troughs 35, 35, and 36 are mounted over transverse openings 37, 37, and 38 formed in the bottom and inclined portions 3 and 4, respectively, of the container 1. Mounted within the troughs 35, 35, and 36 are fluid spray pipes 39 and 40 through which fluid under pressure is forced and admitted into the troughs into downwardly directed orifices 41 of the spray pipes 39 and 40. The fluid forced through the pipes 39 and 40 may be air, washing liquid or water, and in the modification of our invention herein specifically set forth, we utilize water.

The spray pipes 39, 39, and 40 may be supplied with water under pressure from any suitable or desirable source and are herein illustrated as connected by means of pipes 42 with a supply pipe 43 which is connected with a pump 44.

Each of the troughs 35, 35, and 36 is preferably provided with three openings 45 in the form of short necks 46 which protrude from the bottom of the troughs. All of these openings, with the exception of the one end opening of the central trough 35, are provided with annular flanges 47 at the ends of the necks 46. These openings are closed with plugs 48 which are held in position by means of clamps 49. The openings are provided for enabling the troughs 35, 35, and 36 to be cleaned of the foreign matter as it accumulates therein.

A pipe 50 is screwed into the drain neck opening 45 of the one end opening of the middle trough 35, and this opening serves as a drain for emptying the tank. The pipe 50 leads to the sewer or other point of disposal and is provided with a valve 51. In each of the pipes connecting the supply pipe 43 with the spray pipes 39, 39, and 40 there is mounted a control valve 52.

Means are provided for maintaining fluid within the tank 1 to a definite level, and for this purpose drain pipes 53 are connected in the inclined portion of the tank below a screen 54 which is mounted over the inclined portion.

Attached to one side of the tank in a watertight manner is a sheet steel box 55 which is in open communication with the interior of the tank by an outlet formed through the side of the tank 1 and which opening is provided in position to determine the fluid level within the tank 1. The overflow box 55 is provided with an outlet pipe 56 which leads to a sewer or other point of disposal of the wash liquid. The liquid taken from this point of the tank 1 is liquid taken from the entrance end of the tank 1 and is dirty water and is therefore disposed of.

At the forward end of the tank 1 is another water cooling box 57 from which an opening is provided into the wall of the container 1 at the same overflow level as the opening to the overflow box 55. Clean water collects at the forward end of the tank 1 and is returned by means of the pipe 58 to a box 59 in which a suction head 60 of the pump 44 is mounted so that this clean water may be recirculated. Additional water is provided to the pump 44 through a pipe 61 connected with any suitable or desirable source of water supply so that the water as exhausted through the pipe 56 may be replaced.

A gauge 62 is mounted in the water main 43 so that the pressure of operation of the water passing through the sprays 39, 39, and 40 may be determined.

The operation of the washing unit A is that the raisins are conveyed by the conveyor 2 into the throat 31 and are caused to submerge below the surface of the water within the container 1 by the advancing members 6. The raisins, after being forced below the water level, separate into two different classes, the high grade raisins which contain heavy sugar content, and the lighter raisins. The heavier raisins sink to the bottom and the lighter raisins float. The heavier raisins are propelled along the bottom of the container 1 by means of the advancing members 6, and as they advance they fall into the troughs 35, 35 and due to the action of the sprays within these troughs 35, 35, they are, due to their partial buoyancy, propelled out of the troughs while the foreign matter of a heavier specific gravity than the raisins remains in the troughs.

Leaving the second of the troughs 35, the raisins are conveyed up an inclined surface 34 of the container 1 and then are dropped through the opening 38 into the trough 36, where they are likewise propelled out by the action of the spray 40. The remaining foreign matter of specific gravity greater than the raisins is separated from the raisins in this latter trough.

The raisins are then propelled over the screen 54 and passed out of the unit A through the exit throat 63. The raisins which float are conveyed along the surface of the water by means of the advancing members 19, and as these raisins are being conveyed along, the better of these raisins absorb enough water so that they may likewise sink to the bottom of the container and by a conveyor move along by means of the advancing members 6 of the conveyor 5. The lighter raisins, which are of an inferior grade, are conducted along the surface of the water in the container and may be either delivered into the path of moving raisins conveyed by the conveyor 5 as they pass up the inclined surface 4 so that all the raisins may be delivered from the washer unit A together or, as illustrated in the modified form of our invention as shown in Figure 6, a transverse conveyor 64 of any suitable or desirable construction may be located just below the surface of the washing liquid at the upwardly inclined portion 65 of the conveyor 18, and will receive the lighter of these raisins and convey the same outwardly through the side portion of the tank to a separate point of disposal or use. In this way the washing of the raisins by this method is also used as a means of separating or grading the raisins to separate the inferior raisins from the raisins of good, or high quality.

Leaving the throat 63 the raisins are delivered to the unit B, which is a recleaner or cap stemmer of construction well known and understood in the art, and in this unit the stems of the raisins are removed and lighter foreign matter, such as leaves, stems and the like, are separated from the raisins. The particular construction of this cap stemmer or recleaner is so well understood in the art as to make it unnecessary for applicants to specifically describe the construction and operation of this unit.

The raisins leaving the recleaner unit B have adhering thereto water which must be dried from the raisins before they can be packed. In order to dry the raisins and to separate the adhering water therefrom, the raisins are passed into the drying unit C, which is preferably of the following construction.

The raisins leave the recleaning unit B through a hopper 66 and are delivered by this hopper onto a convex surface of a disc 67. The disc 67 is secured to a shaft 68 which is caused to revolve by any suitable or desirable means such, for example, as by means of a belt passing over a pulley 69.

The shaft 68 is supported in bearings 70 and 71 at its opposite ends and is likewise provided with an endthrust bearing 72 to hold the shaft 68 axially stationary. Secured to the shaft below the disc 67 are a plurality of blades 73 which provide fan blades for creating a draft of air. Secured to the shaft 68 below the fan blades 73 is another disc 74 which preferably has its concaved side turned upwardly. Below the disc 74 is another series of fan blades 75. Below the fan blades 75 is a further disc 76 which is likewise secured to the shaft 68. The shaft 68, discs 67, 74, and 76, and fans 73 and 75 are enclosed within a cylindrical screen 77. Mounted below the fan 73 is a frusto-conical funnel 78 which directs the raisins from the screen 77 as they are thrown outwardly under the force of the revolving discs 67 and under the force of the draft of air created by the fan 73 to the lower disc 74. The raisins are by the discs 74 and fan 75 likewise thrown against the screen 77 and are then directed onto the lower disc 76 by means of the funnel 79. The funnels 78 and 79 are secured in position to the cylindrical screen 77. By this method the adhering water is thrown off from and dried from the surface of the raisins and leaving the screen 77, the raisins are delivered onto a shaker table 80. The shaker table 80 may be of any suitable or desirable construction well understood in the art. The raisins from the shaker table 80 are delivered to any suitable source for packing.

Having fully described our invention, it is to be understood that we do not wish to be limited to the details herein set forth, but our invention is of the full scope of the appended claim.

We claim:

A method of separating from raisins foreign matter of a specific gravity greater than the raisins, including the steps of delivering the raisins and foreign matter into a liquid in a container, conducting the raisins and foreign matter along the bottom of the container against the tendency of the raisins to float in the liquid, and directing a blast of fluid against the raisins from below as the raisins are conveyed along the bottom of the container to separate the raisins from the foreign matter through the difference in buoyancy of the raisins and the foreign matter, and conducting the raisins from the container free of said foreign matter.

RAYMOND D. ROBINSON.
WILLIAM H. NOLAND.